(12) United States Patent
Rantanen et al.

(10) Patent No.: US 7,352,896 B2
(45) Date of Patent: Apr. 1, 2008

(54) METHOD FOR INTERPOLATION AND SHARPENING OF IMAGES

(75) Inventors: Henry Rantanen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 729 days.

(21) Appl. No.: 10/685,968

(22) Filed: Oct. 14, 2003

(65) Prior Publication Data

US 2004/0075755 A1  Apr. 22, 2004

(30) Foreign Application Priority Data

Oct. 14, 2002  (FI)  ................................. 20021818

(51) Int. Cl.
*G06K 9/00* (2006.01)

(52) U.S. Cl. ...................... 382/167; 382/266; 348/266; 348/280; 348/273

(58) Field of Classification Search ...................... None
See application file for complete search history.

(56) References Cited

U.S. PATENT DOCUMENTS

| | | | | |
|---|---|---|---|---|
| 4,962,419 | A * | 10/1990 | Hibbard et al. | ............. 348/627 |
| 5,172,227 | A * | 12/1992 | Tsai et al. | ................. 375/240.2 |
| 5,247,352 | A | 9/1993 | Nagler et al. | |
| 5,343,309 | A * | 8/1994 | Roetling | ..................... 358/3.07 |
| 5,382,976 | A | 1/1995 | Hibbard | |
| 5,506,619 | A | 4/1996 | Adams, Jr. et al. | |
| 6,549,233 | B1 | 4/2003 | Martin | |
| 6,628,330 | B1 * | 9/2003 | Lin | ............................ 348/252 |
| 7,006,686 | B2 * | 2/2006 | Hunter et al. | ................ 382/162 |
| 7,020,343 | B1 * | 3/2006 | Avinash | ....................... 382/254 |
| 2001/0055951 | A1 * | 12/2001 | Slotznick | ....................... 455/41 |
| 2002/0041761 | A1 * | 4/2002 | Glotzbach et al. | ........... 396/429 |

FOREIGN PATENT DOCUMENTS

| | | |
|---|---|---|
| EP | 0 457 427 | 11/1991 |
| EP | 1043688 | 10/2000 |
| WO | WO 02/075654 | 9/2002 |

OTHER PUBLICATIONS

"Modulation Transfer Functions and Aliasing Patterns of CFA Interpolation Algorithms;" Topfer et al; Proceedings IS& T's PICS Conference; Annual Conference, Proceedings of Conference of the Society for Imaging Science and Technology; May 17, 1998; pp. 367-370.

* cited by examiner

*Primary Examiner*—Jingge Wu
*Assistant Examiner*—Sean Motsinger
(74) *Attorney, Agent, or Firm*—Alfred A. Fressola; Ware, Fressola, Van Der Sluys & Adolphson LLP

(57) ABSTRACT

A method, a system, a device, a storage means, and a computer software product for sharpening colours in an image, in which a first colour component is interpolated and sharpened in such a way that the effect of the colour component is computed in different directions, the highest and/or lowest value of the computed values is selected to represent the greatest and/or smallest change, after which the colour component is sharpened, if the ratio between the highest and lowest values falls within predetermined limit values. The second colour component is sharpened on the basis of the sharpening of said first colour component. After the sharpening, the second colour component is interpolated, wherein the result is a sharpened and interpolated three-colour image.

40 Claims, 8 Drawing Sheets

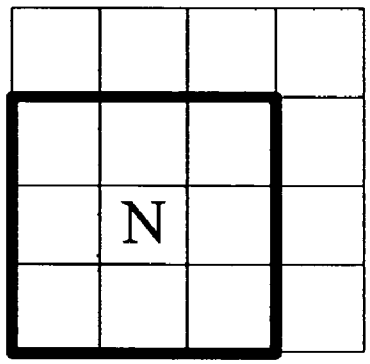
Fig 7a.
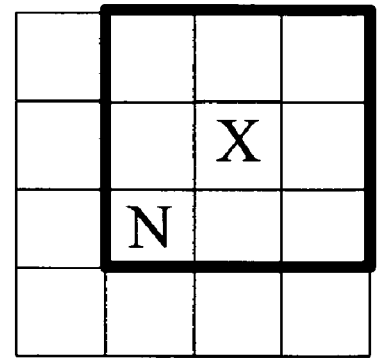
Fig 7b.
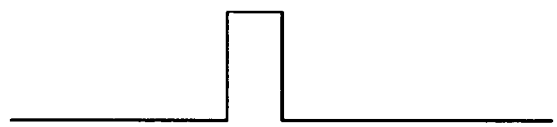
Fig 8a.
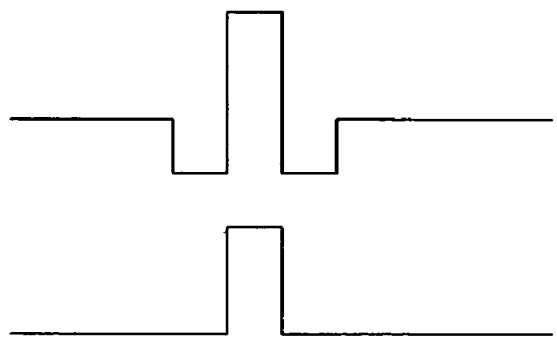
Fig 8b.
Fig 8c.

Fig 9a.
Fig 9b.
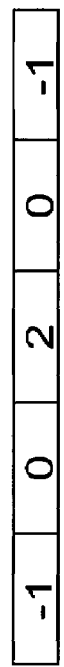
Fig 9c.
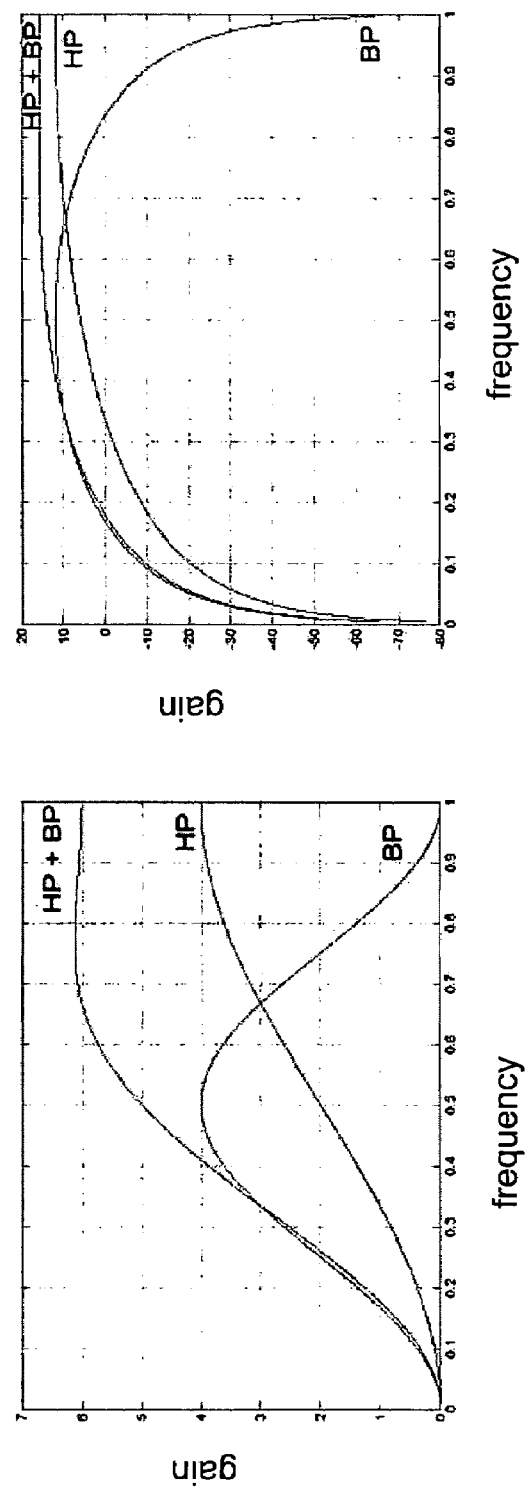
Fig 10a.
Fig 10b.

METHOD FOR INTERPOLATION AND SHARPENING OF IMAGES

CROSS-REFERENCE TO RELATED APPLICATIONS

This application claims priority under 35 USC §119 to Finnish Patent Application No. 20021818 filed on Oct. 14, 2002.

FIELD OF THE INVENTION

The present invention relates to a method for sharpening colours in an image comprising at least a first and a second colour component, the pixels comprising information of the first colour component being located at least partly in locations different from the pixels comprising information of the second colour component. The present invention also relates to a method for processing digital signals in an image comprising at least one colour component. The present invention also relates to a digital filter for processing digital signals in an image comprising at least one colour component. The present invention also relates to a system for sharpening colours in an image with at least a first and a second component and the pixels comprising information about the first colour component are placed at least partly in different locations than the pixels comprising information of the second colour component. Furthermore, the present invention relates to a device for forming an image, which comprises means for sharpening colours in an image with at least a first and a second colour component, and the pixels comprising information about the first colour component being placed at least partly in different locations than the pixels comprising information of the second colour component, a storage means for storing a computer software product, which comprises computer commands for sharpening colours in an image with at least a first and a second colour component, and the pixels comprising information about the first colour component being placed at least partly in different locations than the pixels comprising information of the second colour component. The present invention further relates to a computer software product comprising computer commands for sharpening colours in an image with at least a first and a second colour component, and the pixels comprising information about the first colour component being placed at least partly in different locations than the pixels comprising information of the second colour component.

BACKGROUND OF THE INVENTION

Images taken by means for storing digital images, such as digital cameras, camera phones, or other cameras equipped with a single complementary metal-oxide semiconductor (CMOS) or with a single charge coupled device (CCD), do not comprise all colour component values for each pixel. Because the number of image sensors is decisive with respect to the price and the size of the device, it is obvious that the aim is to use only one (in some situations more than one can be used as well) image sensor in smaller devices (camera devices), wherein a so-called colour filter array (CFA), such as the Bayer matrix, is needed for forming the image.

The Bayer matrix is a common colour array, in which only one colour is sampled in each pixel and which causes that the other colours of the colour system are lacking from each pixel. For example in the RGB colour system (Red, Green Blue), half of the pixels in the Bayer matrix form the green colour component and the other half of the pixels form the blue and the red colour component, and the values of the other colour tones are lacking from each pixel. This creates a need to interpolate the missing colour samples so that the image can be stored in its complete format.

In the text, when referring to colours, the known RGB colour system will be used, which defines the colour by means of the relationship between red (R), green (G) and blue (B). However, it will be obvious that the colour component can also be described by the CMY colour system (Cyan-Magenta-Yellow), in which the colour is formed by values of cyan (C), magenta (M) and yellow (Y). The colour system can also be any other corresponding system.

The conversion of an image in the Bayer matrix format to an RGB image request the interpolation of the missing colour values in each pixel. The interpolation system can be exemplified with an interpolation system utilizing the nearest neighbour pixels (the nearest neighbour method), in which for example the interpolation of the missing blue and red colours is made according to the nearest neighbour pixel of the same colour, as well as with bilinear interpolation, which has been improved so that the interpolation of green is controlled by means of the other colour components. We shall next describe this method as an example. Below, four possible situations will be presented for the position of the colour components in the Bayer matrix:

| a) | | | b) | | | c) | | | d) | | |
|---|---|---|---|---|---|---|---|---|---|---|---|
| G | B1 | G | G | R1 | G | B1 | G | B2 | R1 | G | R2 |
| R1 | G | R2 | B1 | G | B2 | G | R | G | G | B | G |
| G | B2 | G | G | R2 | G | B3 | G | B4 | R3 | G | R4 |

When the missing R and B values are computed for the green pixel G, as under the points (a) and (b), the average values are computed for two neighbours of the same colour. For example under point (a), the value of the blue component B in the green central pixel is the average value of the blue pixels above and under the green pixel G (B(G)=(B1+B2)/2). In a corresponding manner, the value of the red component R in the green central pixel is the average value of the red pixels R adjacent to the green pixel G (R(G)=(R1+R2)/2).

The case in point (c) is one where the blue colour is interpolated for a red pixel R. In this case, the average value is taken from the four closest blue pixels B (B(R)=(B1+B2+B3+B4)/4) which are located at the corners of the red pixel R. Similarly, the value of the red component R in a blue pixel B, under point (d), is obtained by computing the average value of the blue corner pixels B (R(B)=(R1+R2+R3+R4)/4).

The green component G can be interpolated by using the closest neighbour pairs. Below, two cases are presented for interpolating the green component G.

| a) | | R1 | | | b) | | B1 | | |
|---|---|---|---|---|---|---|---|---|---|
| | | G1 | | | | | G1 | | |
| R4 | G4 | R | G2 | R2 | B4 | G4 | B | G2 | B2 |
| | | G3 | | | | | G3 | | |

-continued $$R3 \quad B3$$

Under point (a), the value of the green component G is interpolated for a red pixel R. The value of the green component G is thus:

$$G(R) = (G1 + G3)/2, \text{ if } \text{abs}(R1 - R3) < \text{abs}(R2 - R4),$$

$$(G2 + G4)/2, \text{ if } \text{abs}(R1 - R3) > \text{abs}(R2 - R4),$$

$$(G1 + G2 + G3 + G4)/4, \text{ if } \text{abs}(R1 - R3) = \text{abs}(R2 - R4).$$

In other words, the effect of the red component R is taken into account in the interpolation. If the difference between R1 and R3 is smaller than the difference between R2 and R4, it is noticed that the red R is stronger in the vertical direction, wherein the average value of the vertical neighbours G1 and G3 is used for computing the desired value in the interpolation. On the other hand, if the horizontal effect is greater, the adjacent neighbours are used respectively. If the ratio of red is the same throughout, all the four neighbours are used. In connection with the blue colour component B, a similar computation is made under point (b).

Publication U.S. Pat. No. 6,549,233 B1 discloses one method for colour interpolation by means of the Bayer matrix. The method of the publication includes calculating colour intensity gradients for the image, of which the highest and lowest gradient value is determined. The gradients are calculated between the first colour locating in the centre pixel of the matrix and the similar colours spaced from that. Calculated gradients are compared to threshold value, and if a gradient exceeds said threshold value (which is formed of the average of the intensities of the colour) in that colour, the intensity value of the centre pixel is used for the pixel spaced from it.

U.S. Pat. No. 5,247,352 discloses a method for sharpening a colour image. In the method, the sharpening is based on a three-dimensional colour space, for example the Munsell colour chart. The publication presents several switch states for defining the sum of colour difference signals and at least two sharpening signals. The switch states are set by means of a colour coordinate system. The system determines the pixel locations on the basis of the colour values of the pixels. The positions of the switches are based on position data. On the basis of information transmitted by the switches, the device according to the publication can combine the desired sharpening signals with the colour difference signals. In this way, the image can be sharpened. So that the sharpening of the image would be of as good a quality as possible, there must be at least two sharp signals, red and green. In other words, in the method of the patent, the filtering of the second and the third colour components is adjusted on the basis of a value obtained from the colour space.

After the interpolation, all the colour components must be sharpened, which causes triple work for the image processing, which, in turn, requires that the processing system has a high processing capacity. The present invention improves the prior art by filtering the other colour components by utilizing the filtering result of a single colour component. In systems of prior art, the filtering in different components may cause different effects, wherein distortions may occur in the colours of the image. Also, in known sharpening functions, two kinds of undesired phenomena may occur, such as an increase in the noise and, particularly close to edges, excessive sharpening of the edge. This, in turn, causes ringing, which is manifested, for example, as a black line in connection with a white line.

SUMMARY OF THE INVENTION

It is an aim of the present invention to facilitate the problems occurring in image processing by combining the interpolation and the sharpening in such a way that the effect of the sharpening filtering of the first colour component is utilized to control the sharpening of the next colour components. In the method for sharpening an image according to the invention, one colour component is first interpolated and this interpolated colour component is sharpened. After this, the effect of the sharpening on the interpolated image is examined by deducing from each pixel of the sharpened image the corresponding pixel of the unsharpened image. If the effect of the sharpening on the first component was significantly high in a given pixel, the sharpening is performed for the second or third colour component, if there is one at the point in question. If the effect was lower, the possible pixel of the second or third colour component is kept unchanged. In this way, the original pixels of the second and third colour components are, for the necessary parts, already sharpened before the interpolation of these colour components. In the filtering, it is possible to use any filtering mask of the prior art. However, the most advantageous final result is obtained by using such an adaptive sharpening filter which only processes those pixels which are true edge pixels, wherein the edge strength can be used in the control of the sharpening.

To put it more precisely, the method for sharpening images according to the present invention is primarily characterized by sharpening the second colour component on the basis of the sharpening of the first colour component. The method for processing digital signals in an image is primarily characterized by the change of the colour component computed in at least two different directions to obtain at least two original change values, from the computed original change values, a maximum value and a minimum are selected to obtain at least two change values, and a ratio is determined based on said change values. The digital filter for processing digital signals in an image is primarily characterized by performing the above method for processing digital signals in an image. The system according to the invention is primarily characterized by means for sharpening the second colour component on the basis of the sharpening of the first colour component. The device according to the invention is primarily characterized by means for sharpening the second colour component on the basis of the sharpening of the first colour component. The storage means according to the invention is primarily characterized by a computer software product that comprises computer commands for controlling the sharpening of said second colour component on the basis of the sharpening of said first colour component. The computer software product according to the invention is primarily characterized by computer commands for sharpening colours in an image with at least a first and a second colour component, and the pixels comprising information about the first colour component being placed at least partly in different locations than the pixels comprising information of the second colour component.

By the method according to the invention, in which interpolation is interleaved with sharpening, the effect required by the computation can be reduced without affecting the quality of the image. By the method according to the invention, it is even possible to achieve a better image quality than in the conventional method, in which the whole sharpening of the image is made first after the interpolation.

In addition to this, the sharpening method used in the invention is self-adaptive, wherein it is not used for sharpening uniform image areas, which will, in turn, reduce the quantity of noise in the image. Furthermore, by the method of the invention, the sharpening efficiencies are limited close to clear edges, to prevent ringing caused by over-sharpening. This makes the image more pleasant to look at.

Furthermore, the size of the sharpening filter window (3×3) used in the invention has an advantageous effect on the memory loading, because most of the matrix rows do not need to be stored in the device as in the methods of prior art. Moreover, the size of the filter window reduces the heavy computing required in the processing, because the method is primarily based on making choices.

DESCRIPTION OF THE DRAWINGS

The present invention will be described in more detail with reference to the following drawings, in which FIGS. 3a to 3d shows the horizontal, vertical and diagonal directions of a sample with the size of 3×3 pixels, FIGS. 7a to 7b shows a sharpening windows containing a noisy pixel, FIGS. 8a to 8c illustrates the visibility of the noisy pixel after the filtering according to the invention, FIGS. 9a to 9c illustrates three examples of filtering masks, FIGS. 10a to 10b illustrates frequency responses of the filtering masks.

DETAILED DESCRIPTION OF THE INVENTION

Figure 1:
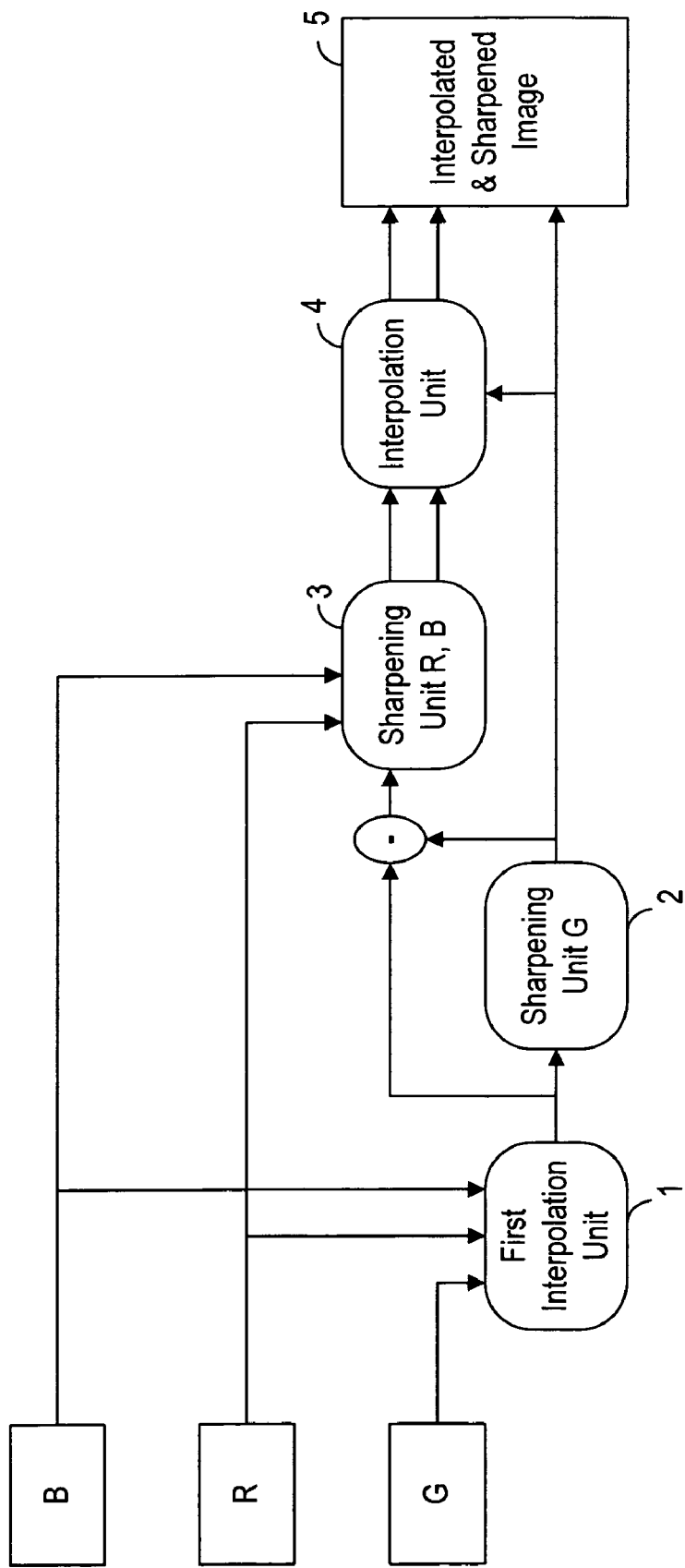
FIG. 1 shows the processing order according to the invention for the interpolation and sharpening of a Bayer matrix image.

FIG. 1 shows the operating sequence of the method according to the invention for the interpolation and sharpening of a Bayer matrix image. Block 1 shows the interpolation of the image with respect to a first colour component G with full resolution in a known way. The first colour component G is preferably green because of the number of green pixels in relation to the number of blue and red pixels in the Bayer matrix (G:B:R 2:1:1). If the pixel numbers were different from those described, the first colour should be selected to be the colour component which the greatest number of pixels or the component whose change has the greatest effect on the luminance. After the interpolation of the image has been completed, the image is sharpened accordingly with respect to the first colour component G, as will be shown in block 2.

In block 3, the image is subjected to the sharpening of the second R and the third B colour components. At first, the effect of the sharpening for the first colour component G is compared with the interpolated colour component G. If this effect (abs[Sharpened—Unsharpened]) is significant, the 2nd and 3rd colour components of the corresponding point are sharpened by using the change caused by the sharpening of the first colour component as such or in proportion to the changes in the neighbour pixel values. If the effect is low, no sharpening is made.

In block 4, the second and the third colour components are interpolated. The described process results in an interpolated and sharpened three-colour image (block 5).

The sharpening process (blocks 2 and 3 in FIG. 1) will now be described in more detail. As mentioned, the sharpening of the first colour component is started right after the interpolation of said component. After this, according to the invention, the second and third colour components are sharpened, if necessary.

Figures 2, 3:
FIG. 2 shows the basic principle of the sharpening method according to the invention.

FIG. 2 shows the basic principle of the sharpening algorithm. At first, the second degree gradients (Laplacian) are computed for the first colour component G, to be able to monitor the change on the colour component and the intensity of the change, whereby the true edge pixels can be detected. The computation can be advantageously implemented by computing the gradients in four different directions in a sample of 3×3 pixels (FIG. 3). The directions are the horizontal (3a), vertical (3b) and diagonal (NWSE=Northwest-Southeast, 3c; NESW=Southwest-Northeast, 3d) from the central pixel O. In the gradient computation, the two outermost pixel values (D, E; B, G; A, H; C, F) are first summed up in a given direction, after which the sum is deducted from the original pixel value O which has been multiplied by two. This is performed in each direction, whereby gradients are obtained for each direction:

GradHor=2×O−(D+E) (or GradHor=2×O−D−E)
GradVer=2×O−(B+G) (or GradVer=2×O−B−G)
GradNWSE=0.75×(2×O−(A+H))
(or GradNWSE=0.75×(2×O−A−H))
GradNESW=0.75×(2×O−(C+F))
(or GradNESW=0.75×(2×O−C−F))

For a human observer, the changes are normally more significant in the horizontal and vertical directions; therefore, the diagonal gradients are attenuated by multiplying them with a constant smaller than one. Furthermore, it should be taken into account that in the diagonal directions, the distance between the adjacent pixels is greater than in the horizontal and vertical directions. The ratio between the distances is exactly $1/\sqrt{2} \approx 0.71$.

For the above-mentioned reasons, the coefficient 0.75, which is more advantageous than 0.71 in calculations, is used in the computation of GradNWSE and GradNESW. This value may also be another value, preferably smaller than the figure one, wherein the choice of either the horizontal or the vertical direction is preferred.

The computed gradients represent the original change values, from where, the minimum and maximum values are searched. These minimum and maximum values are used to obtain the change values to be used in the sharpening. The first change value T1 is that absolute value which is smaller of the minimum and maximum absolute values. The other change value T2 is that absolute value which is larger of the minimum and maximum absolute values. In other words the first change value T1 is that (absolute) value which is smaller of the absolute values of the (searched) minimum and maximum values and the other change value T2 is that (absolute) value which is larger of the absolute values of the (searched) minimum and maximum values. The sharpening function of the first colour component is based on the ratio between these change values. Change values T2 and T1 indicate the greatest and the smallest changes, respectively. The ratio between these figures indicates how important a change has taken place. Furthermore, information is stored about sign of the gradient of the other change value (T2).

In the examination of the gradients, five interesting cases can be found to control the sharpening. Examples of these cases are shown in FIGS. 4a to 4e, wherein the drawn circulars represent an order of the original change values (gradients), from where the T1 and T2 are selected.

Figure 4:
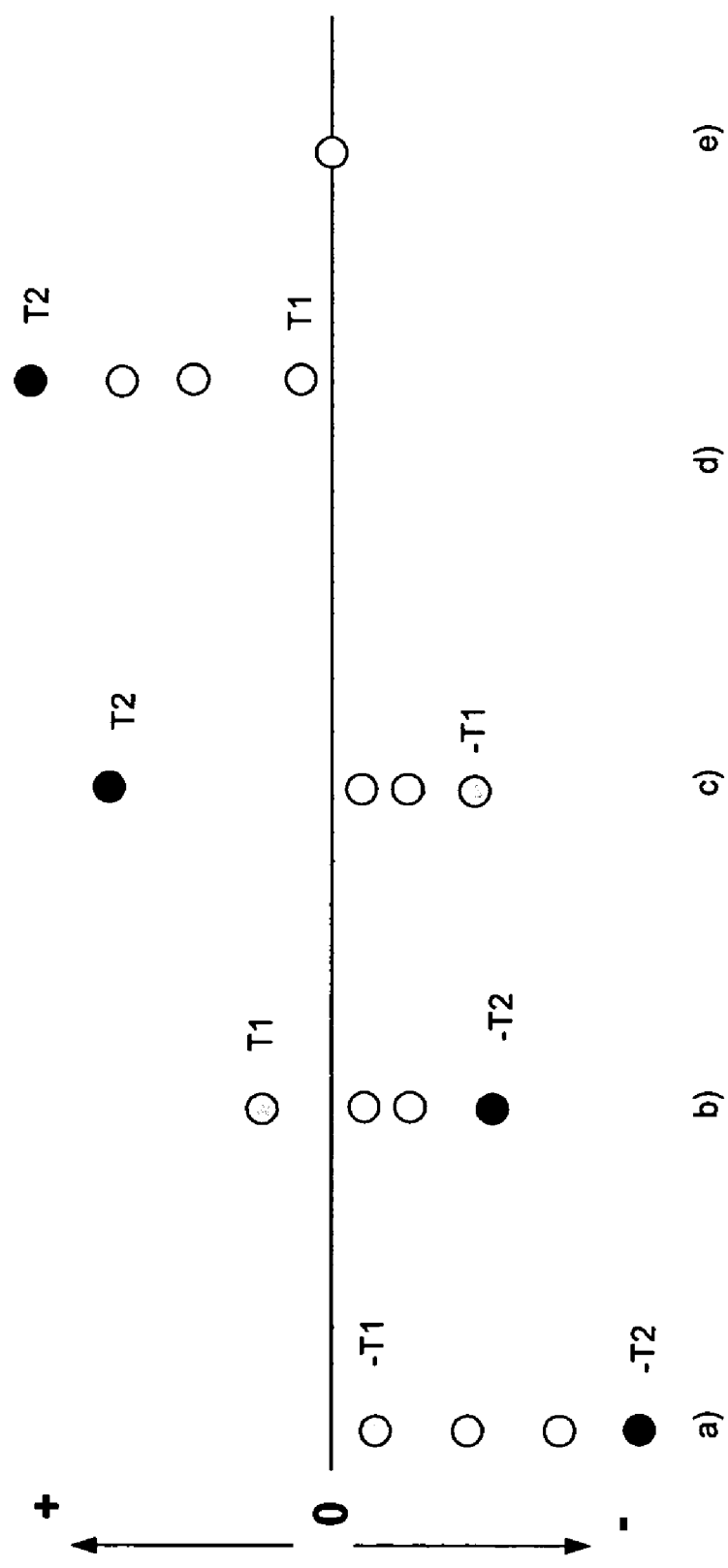
FIGS. 4a to 4e shows interesting example cases occurring in the gradient computation according to the invention.

FIG. 4a: All the gradient values are negative. The smallest gradient value corresponds to the greatest change; in other words, it has the greatest absolute value.

FIG. 4b: The gradients are distributed on both sides of the O-axis so that the gradient with the highest absolute value is on the negative side. As a result, the smallest gradient value indicates the greatest change.

FIG. 4c: The gradients are distributed on both sides of the O-axis so that the gradient with the highest absolute value is on the positive side. The highest gradient indicates here the greatest change.

FIG. 4d: All the gradient values are on the positive side. The highest gradient value indicates the greatest change.

FIG. 4e: All the gradient values are 0, wherein the image area is constant and there is no need for sharpening.

The sharpening of the colour component is controlled on the basis of the changes so that if change value (T2) is not sufficiently great (preferably T2≦2 when an 8-bit presentation form is used for the colour component), wherein the image area does not contain clear edges, and no sharpening is needed. In other cases, the ratio between the change values is computed (ratio=T1/T2). To subdue this ratio, it is also possible to add a constant value (const1, const2) to each change value T1, T2, wherein the following equation is formed:

ratio=[T1(+const1)]/[T2(+const2)].

The constants used in this equation can be unequal or equal to each other. Because of the image processing method or another factor relating to the properties of the image, it may be necessary to use unequal constants, but typically these constants are equal. It is also possible that the values are only constant on a given area in the image, in other words that different constant values are used in different areas of the image.

The constant values (const1, const2) are small, preferably for example 3 or another value between 1 and 10. The computed ratio is compared with two predetermined limit values, Slim1, Slim2. The values for these variables are preferably Slim2=0.8 and Slim1=0.3. The values may also be other figures, whereby as good a quality is achieved as possible for the output image in a way as simple as possible, for example Slim1=0.1-0.5 and Slim2=0.5-1.0. The few values of the ratio occur between the limit values, the faster the pixel value can be computed. With respect to the speed, it is advantageous that Slim2 is as small as possible.

Sharpening will not be needed, if the change ratio is greater than or equal to the second limit value (Slim2) (ratio>Slim2). Thus, there may be noise in the image location, wherein the change values T1, T2 have the same sign and are almost equal. Another alternative is that the change values T1, T2 have opposite signs but an almost equal absolute value, wherein the direction of the sharpening cannot be predicted. In both cases, it is worthwhile not to perform sharpening.

If the change ratio is smaller than or equal to the first limit value (Slim1) (ratio≦Slim1), it can be presumed that said pixels are true edge pixels, wherein maximum sharpening is used. The sharpening (sharp) is implemented by multiplying the change value T2 with a gain whose value is predetermined, and preferably the gain=0.6. The gain may also be another value. The purpose of the gain is to highlight the clear edges further. The sharpening function (sharp) is thus brought to the format:

sharp=O+sign×T2×gain

If the change ratio is set between the limit values (Slim2>ratio>Slim1), the sharpening function is adjusted with a weight coefficient (weight). The weight coefficient is computed by multiplying the difference between the second limit value (Slim2) and the gradient ratio (ratio) with a coefficient dependent on the limit values (coeff):

$$coeff = \frac{1}{Slim2 - Slim1}, \text{ and}$$

$$weight = coeff \times (Slim2 - ratio)$$

The weight coefficient (weight) is reduced between the limit values (Slim1, Slim2) linearly from one to zero as the ratio is increased. For this reason, the computation of the weight coefficient becomes as easy as possible, when the limit values are selected Slim2=0.8 and Slim1=0.3, wherein coeff=2. The limit values must be very close to these values to avoid excessive reduction of the effect of sharpening or to avoid sharpening of wrong pixels. The weighted sharpening function is thus:

sharp=O+sign×(weight×T2)×gain

If the value of the sharpening function (sharp) is different from the original average pixel value (O), a final examination is made. If the proposed change in the sharpening function (abs(sharp−O)) is greater than the allowed predetermined sharpening limiter (over), the output value can be limited; in other words, over-sharpening is prevented. The value of the sharpening limiter (over) is preferably 40 (in an 8-bit system), but it can also be another value according to the preferences of the viewer. If the sign is negative, the output (sharp) cannot be smaller than the one with the smallest pixel value in the selected sharpening direction (Min(x, O, y), in which x and y are the outermost pixels in the environment of the central pixel O in the filtering window), from which the value of the sharpening limiter (over) has been deducted. On the other hand, if the sign is positive, the output cannot be greater than the greatest pixel in the selected sharpening direction (Max(x, O, y), x and y as above), to which the value of the sharpening limiter (over) has been added. The table hereinbelow shows the control value and the final sharpening output (final) after the selected sharpening direction has been examined.

| Direction of the greatest change (DLC) | Sign of the DLC | Control value (CW) | | Final output (final) |
|---|---|---|---|---|
| Horizontal | negative | Min (D, O, E) over | − | Max (sharp, CW) |
| Horizontal | positive | Max (D, O, E) over | + | Min (sharp, CW) |
| Vertical | negative | Min (B, O, G) over | − | Max (sharp, CW) |
| Vertical | positive | Max (B, O, G) over | + | Min (sharp, CW) |

-continued

| Direction of the greatest change (DLC) | Sign of the DLC | Control value (CW) | | Final output (final) |
|---|---|---|---|---|
| NW-SE | negative | Min (A, O, H) over | − | Max (sharp, CW) |
| NW-SE | positive | Max (A, O, H) over | + | Min (sharp, CW) |
| NE-SW | negative | Min (C, O, F) over | − | Max (sharp, CW) |
| NE-SW | positive | Max (C, O, F) over | + | Min (sharp, CW) |

It can be seen in table that the final sharpening output (final) is either the control value (CW) or the value of the sharpening function (sharp). Max(sharp, CW) means that the final output is either the control value (CW) or the value of the sharpening function (sharp), depending on which one is greater. In a corresponding manner, Min(sharp, CW) means that the final output is either the control value (CW) or the value of the sharpening function (sharp), depending on which one is smaller.

The above-presented limit values Slim1 and Slim2 do not change when the value range of the colour system is changed, for example, from 8 bits to 16 bits. However, the value of the sharpening limiter over is multiplied according to the bit number in such a way that, for example, when the value range of the colour system is changed from 8 bits to 10 bits, over(10)=over(8)×$2^{(10-8)}$.

If there is a second or third colour value at the pixel of the sharpened first colour, the pixel of the second or third colour is sharpened accordingly. The final change (final-O) in the pixel value caused by the sharpening of the first colour component is directly added to the colour component to be sharpened (rb), if the difference between the pixel values of the first colours before the sharpening, O, and after the sharpening, final, is small (abs(final−O)≦2, (8-bit)):

rb'=rb+(final−O).

If the difference in the pixel of the first colour before the sharpening, O, and after the sharpening, final, is sufficiently great (abs(final−O)>2, (8-bit)), the sharpening is proportioned to the difference between the maximum and the minimum of the neighbour pixel values.

In the proportioned sharpening, the following steps are taken. Let us assume the following mask which includes all the existing pixel locations.

a  b  c  d  e f  g  h  i  j k  l  m  n  o p  q  r  s  t u  v  x  y  z

Let us assume that m is the location of the pixel under examination, where the sharpening has been performed for the first colour and where there is a second or a third colour. Let us tame the positions of the nearest pixels of the same colour (second or third colour) around the location m in the horizontal and vertical directions. Thus, the points c, x, k and o are obtained. Of these found locations c, x, k and o, the minimum minC and maximum maxC pixel values are searched for. In corresponding locations, also the pixel values after the interpolation of the first colour component (before the sharpening) are checked, of which also the minimum min1 and maximum max1 pixel values are searched for. If the difference between the pixel values (maxC−minC) of the second or third colour component (rb) of the original image is smaller than the difference (max1−min1) between the corresponding pixel values of the first colour component of the interpolated image [(maxC−minC) <(max1−min1)], the following formula is used for sharpening:

$$rb' = rb + (\text{final} - O) * \frac{\text{maxC} - \text{minC} + add1}{\text{max1} - \text{min1} + add2},$$

in which add1, add2 are the subdual coefficients of the ratio, preferably 3 in a system of 8 bits. It should be noticed, that add1, add2 can be also unequal to each other. In other respects, the above-described formula is applied:

rb'=rb+(final−O).

After the necessary pixel locations have been scanned by sharpening the desired colour components, the second and third colour components are interpolated.

The pixels of the second (R) and third (B) colour components in different locations (where there is originally no second or third colour component (R/B)) are sharpened automatically in connection with the last interpolation when interpolation based on the Laplacian2 operation is used, as described, for example, in U.S. Pat. No. 5,506,619. In the method according to the reference, the interpolated first colour component G is subjected to computation of the second degree Laplacian correcting value D which is deducted or added to the pixel of the second, i.e. red R, or third, i.e. blue B, colour component. Consequently, said second or third colour component does not need to be sharpened separately.

The above-described method of the invention for processing an image can be presented by the following pseudo code:

Sharpening of the First Colour Component

```
GradHor = 2 × O − (D + E);
GradVer = 2 × O − (B + G);
GradNWSE = 0,75 × (2 × O − (A + H));
GradNESW = 0,75 × (2 × O − (C + F));
MinGrad = Min(GradHor, GradVer, GradNWSE, GrandNESW);
MaxGrad = Max(GradHor, GradVer, GradNWSE, GrandNESW);
If (abs(MinGrad) > abs(MaxGrad)) then
    T2 = abs(MinGrad);
    T1 = abs(MaxGrad);
    Sign = MinGrad/abs(MinGrad);
else
    T2 = abs(MaxGrad);
    T1 = abs(MinGrad);
    Sign = MaxGrad/abs(MaxGrad);
If (T2 > 2) then
    ratio = (T1 + const1) / (T2 + const2);
    If (ratio ≧ Slim2) then
        sharp = O;
    On the other hand, if (ratio ≦ Slim1) then
        sharp = O + sign × T2 × gain;
    else
        weight = coeff × (Slim2 − ratio);
        sharp = O + sign × (weight × T2) ×gain;
    in which const1, const2 = 3
        Slim2 = 0.8;
        Slim1 = 0.3;
```

-continued

```
        gain = 0.6;
        coeff = 2 (1/(Slim2−Slim1))
    If (abs(sharp − O)) > over then
        If (sign < 0) then
            CW = Min(x, O, y) − over
            final = Max(sharp, CW)
        else
            CW = Max(x, O, y) + over
            final = Min(sharp, CW)
        in which the pixels x and y are determined according
        to the selected direction around the central point O of
        the filtering window
    else
        final = sharp;
else
    final = O;
```

Sharpening of the Original Pixels of the Second or Third Colour Components

```
If there is a pixel of the second or third colour component in the location
of the point O of the sharpened first colour component, then
    rb = the value of the second or third colour component in the
        location of the point O of the sharpened first colour
        component;
    If (abs(final − O)) ≦ 2 then
        rb' = rb + (final − O);
    else // proportioned sharpening
        If ((maxC − minC) < (max1 − min1)) then
            rb' = c + (final − O) × ((maxC × minC +
            add1) / (max1 − min1 + add2))
        in which add1, add2 = 3
            minC = Min (OriNeigboursC(rb))
            maxC = Max (OriNeigboursC(rb))
            min1 = Min(IntNeigbours1(rb))
            max1 = Min(IntNeigbours1(rb)
    OriNeigboursC = values of the closest (c,x,k,o)
    original pixels of the second/third colour component
    IntNeigbours1 = values of the closest (c,x,k,o)
    interpolated pixels of the first colour component
    else
        rb' = rb + (final − O).
```

The above-described image sharpening method can also be carried out by using another change value T3 instead of the change value T2. The change value T3 is the absolute value of that original gradient value that is, in order of the original change values, closer to the value having a larger absolute value of the selected minimum and maximum values than to the one having a smaller absolute value. In other words T3 is the absolute value of that original gradient value which follows the gradient value indicated by T2 when proceeding towards to the gradient value indicated by T1 in order of the original change values. For example, there are gradient values, i.e. the original change values in order, −8, −1, 2 and 5. From said original change values the minimum (−8) and maximum (5) values are selected. The larger absolute value of those is marked as T2 and smaller one is marked as T1, wherein T2=8 and T1=5. As said, the value T3 is the absolute value of the gradient value closer to the gradient value behind T2, wherein the wanted gradient is −1 and the absolute value of T3 is 1. It should be noticed that the T3 is not necessarily the value with the second largest absolute value, because (like in the presented example) the second largest absolute value is T1, which is already used for indicating the smallest change. Also the gradient 2 has a larger absolute value than the gradient −1, but the gradient 2 is in order closer to the T1, wherein it cannot be chosen for T3.

Figure 6:
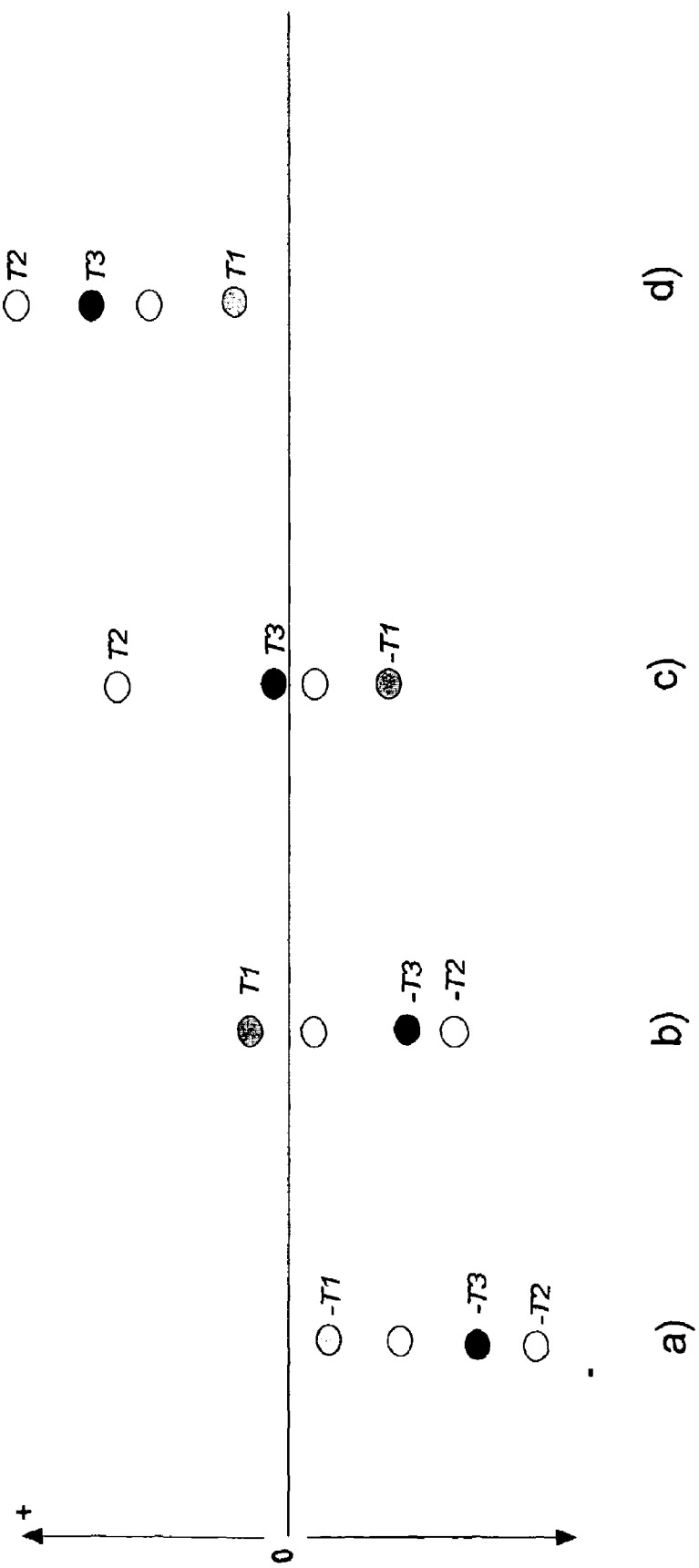
FIG. 6a to 6d shows four interesting example cases occurring in the gradient computation using the second highest gradient.

FIG. 6 shows four interesting cases for T1, T2 and T3. The drawn circulars represent the order of the original change values (gradients), from where the T1, T2 and T3 are selected.

FIG. 6a All the gradient values are negative. The sign of the change value T3 is negative.

FIG. 6b: The gradients are distributed on both sides of the O-axis so that the change value T3 is on the negative side and have the negative sign.

FIG. 6c: The gradients are distributed on both sides of the O-axis so that the change value T3 is on the positive side and have the positive sign.

FIG. 6d: All the gradient values are on the positive side. The sign of the change value T3 is positive as well.

When the change value T3 is used, the ratio between the absolute values is computed (ratio=T1/T3) similar to the T2. It should be noticed that there is a possibility when the change value T3 is smaller than the change value T1, wherein the ratio is T1/T3>1. In that case the sharpening is not made. Otherwise the equation is formed as shown below:

ratio=[T1(+const1)]/[T3(+const2)].

The algorithm is carried forward similar to the case described earlier, only that the formed ratio and the change value T3 is used. The use of the change value T3 instead of the change value T2 improves the sharpening filter performance. The change value T2 can be sometimes affected by noise and the change value T3 is more reliable to represent the actual largest change.

One example of the appearance of the noise is shown in FIG. 7. FIG. 7 shows a flat area containing one noisy pixel N. When the noisy pixel is a centre pixel of the sharpening window (FIG. 7a), it is not sharpened according to the invention. But when it is not in the middle (FIG. 7b), it affects to the sharpening. The noisy pixel N is selected for T2, which causes the original single noisy pixel to be surrounded by changed pixel values in the filtered image, and this emphasizes the visibility of the noisy pixel. This situation is simplified to FIG. 8, where FIG. 8a shows the original pixel, which is filtered by T2 (FIG. 8b) and which is filtered by T3 (FIG. 8c). As it can be noticed, the use of the value T2 accentuates the noise in the filtered area.

The above-described image sharpening method is carried out with the high-pass mask. This is not mandatory for also the band-pass mask can be used either alone or combined with the high-pass filtering. The band-pass mask takes samples from larger area and thus it is capable to enhance low-gradient edges, which are not seen by the high-pass mask. FIG. 9 shows some examples of how high-pass (9a), corresponding band-pass (9b) and combined high-pass/band-pass (9c) masks can be made. The combined high-pass/band-pass mask (HP+BP) behaves like the high-pass filter (HP), but it operates on lower frequencies also, as can be seen from FIG. 10; the −6 dB point (gain=2) of the high-pass filter (HP) is at frequency of 0.5 and with the combined filter (HP+BP) it is on much lower frequency, at 0.25. The FIG. 10a shows linear gain, wherein the FIG. 10b shows logarithmic scale for gain.

Figure 11:
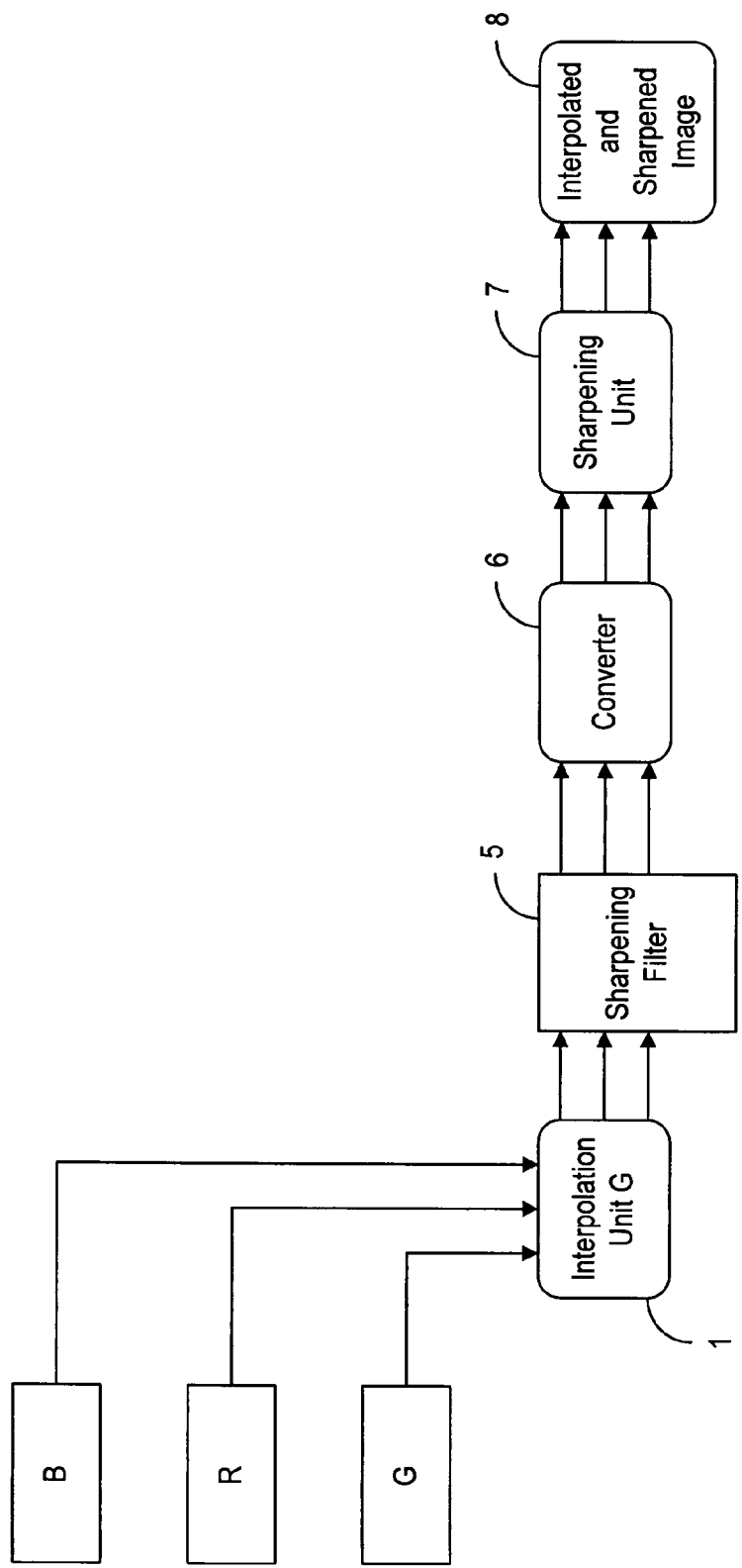
FIG. 11 illustrates on example of the processing order for the interpolation and sharpening of a Bayer matrix image.

The above-described algorithm used in sharpening can be also utilized in sharpening colour component as presented by one example shown in FIG. 11. In this example the colour signals R, G, B are first interpolated (block 1) and then sharpened by a sharpening filter (block 7). The interpolation is typically (but not always) done in stages; the colour signal G is interpolated first and then the colour signals R and B. Then R, G, B signals can, in some situations, be converted (block 6) into Y, U, V signals, wherein at least the luminance Y is then sharpened (block 7). This results in an interpolated and sharpened image (block 8), with all three colour components.

Also it should be noticed that the algorithm discussed in this description can be applied in sharpening as presented, but also in other signal processing methods where colour signals are processed, e.g. for reducing noise, by e.g. a digital filter.

Figure 5:
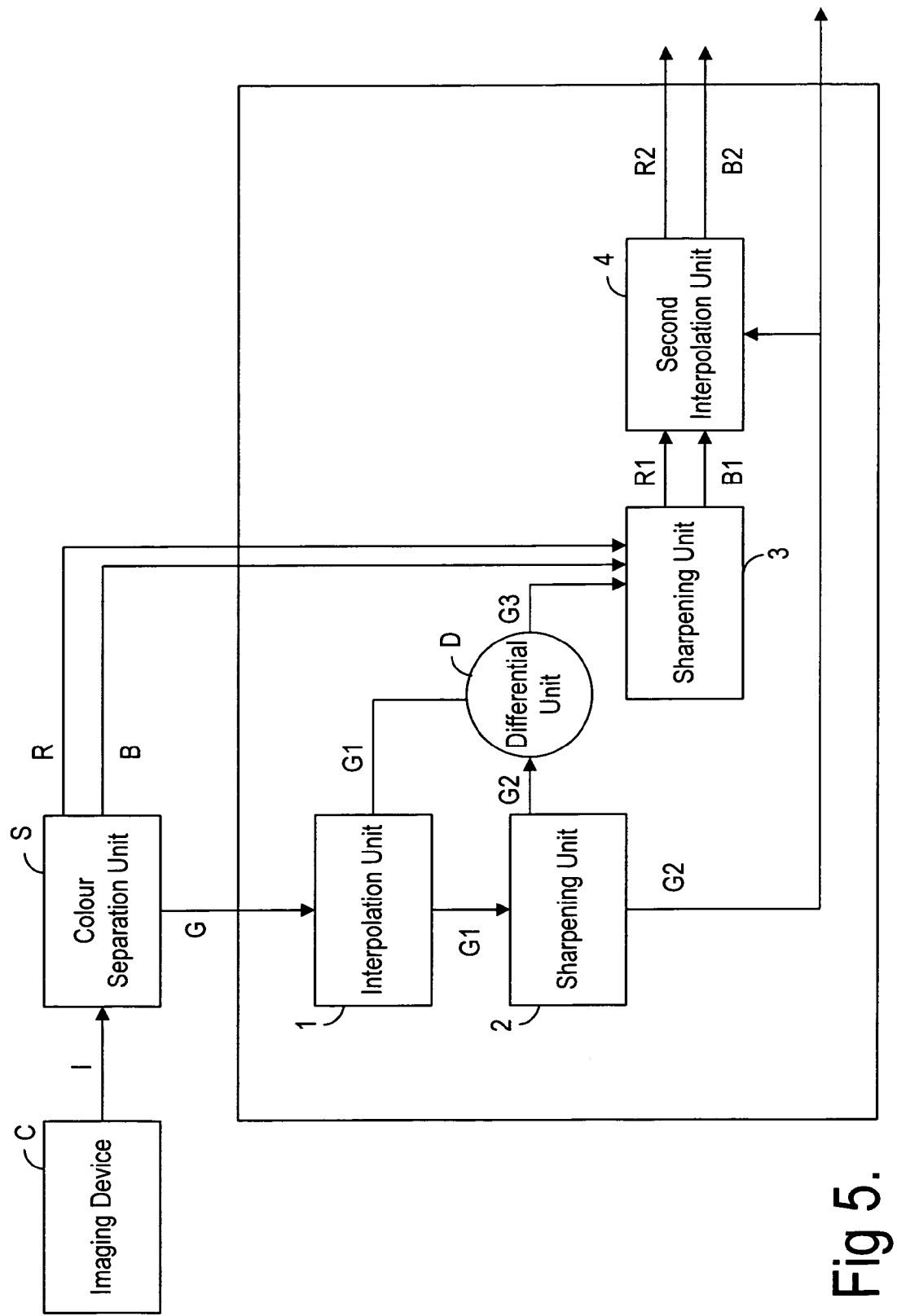
FIG. 5 shows an advantageous embodiment for the image processing system according to the invention.

The above-described image sharpening method according to the invention can be implemented with an image processing system which is shown in FIG. 5. An imaging device C (a camera or the like) produces a Bayer matrix image I for the image processing system. The matrix image I is divided in a colour separation unit S into three colour components which are represented by signals R, G, B. For example, the signal G represents the green colour component which is led for processing in an interpolation unit 1 to generate a signal G1. The interpolated signal G1 is sharpened in a sharpening unit 2, the resulting signal G2 being compared with the interpolated signal G1. The deviation G3 from the signals G2-G1 given by a differential unit D is led together with the colour signals R, B to another sharpening unit 3. The colour signals R, B are preferably the red and blue colour components. If necessary, said signals R, B are sharpened in the second sharpening unit by the effect of the deviation G3. Next, the formed sharpened signals R1, B1 are led to a second interpolation unit 4, in which the signals R1, B1 are processed, producing interpolated signals R2, B2. In said interpolation unit 4, the colour pixels to be interpolated (from which the green colour component G was missing) are automatically sharpened. As the output from the image processing system, a three-colour image is obtained, in which each colour component has been sharpened.

It will be obvious for anyone skilled in the art that the above-described invention can also be applied in other systems than those applying the Bayer matrix. The method according to the invention is advantageous in systems in which all the colour components are not collected for all the pixels. An example is a device which records an intensity value for each pixel but a colour value for only some of the pixels. In view of the application and the basic operation of the invention, it is not significant in which way colour components are left missing from some pixels. An example to be mentioned is a hexagonal colour system which can be easily implemented by applying the invention.

In addition to what has been discussed above, it will be obvious that the colour components can also be other than green G, red R and blue B. The invention can be applied, for example, in devices which record, at various resolutions, any electromagnetic radiation with two different wavelengths, such as light, infrared radiation, ultraviolet light, or radiation with a shorter wavelength, such as gamma or x-ray radiation, or radiation with a longer wavelength, such as microwave radiation. Furthermore, the invention can be applied in such cases in which the components to be sharpened are obtained as a combination of the above-mentioned components. Consequently, the colour component may belong to a colour system which is preferably selected from the group RGB, CMY, CMYK, HSI, or YUV.

The image processing system according to the invention can be implemented as a part of an electronic device, for example in a digital signal processing unit in a camera, or the like. The system also comprises means for interpolating digital signals and means, e.g. a digital filter, for sharpening them. Typically, the electronic device also comprises other functions, such as means for displaying image information to the user and a processor for controlling the electronic device. A digital camera comprising the image processing system according to the invention can be preferably implemented in connection with a mobile device, either as a separate unit or integrated in the device, which mobile device also comprises means for mobile communication. Furthermore, the digital camera comprising the image processing system according to the invention may be connected to a communication network (e.g. the Internet), such as WebCam.

It will be obvious that the present invention is not limited solely to the above-presented embodiments, but it can be modified within the scope of the appended claims.

The invention claimed is:

1. A method comprising:
  locating pixels comprising information of a first colour component of an image at least partly in locations different from the pixels comprising information of a second colour component of said image;
  interpolating said first colour component and said second colour component;
  sharpening at least said first colour component by:
  computing the change of the first colour component in at least two different directions to obtain at least two original change values,
  selecting at least a maximum value and a minimum value to obtain at least two change values based on said at least two original change values, and
  determining a ratio based on said change values; and
  controlling the sharpening of said second colour component based on the sharpening of said first colour component.

2. The method according to claim 1, wherein based on said change values, the ratio is determined to be computed between a first change value and another change value.

3. The method according to claim 2, wherein said first change value is the smaller of the absolute values of the selected minimum and maximum values.

4. The method according to claim 3, wherein said other change value is the larger of the absolute values of the selected minimum and maximum values.

5. The method according to claim 3, wherein said another change value is the absolute value of an original change value that is, in order of the original change values, closer to the value having a larger absolute value of the selected minimum and maximum values than to the value having a smaller absolute value.

6. The method according to claim 1, wherein the determined ratio is used to control the degree of sharpening of the first colour component.

7. The method according to claim 6, wherein the control comprises:
  selecting at least one limit value, and
  comparing the determined ratio with at least one limit value, wherein the result of the comparison is used to control the sharpening of the first colour component.

8. The method according to claim 7, wherein the first colour component is sharpened, if said ratio is smaller than said limit value.

9. The method according to claim 6, wherein the control comprises:
  selecting at least a first limit value and a second limit value, comparing the determined ratio with said first and second limit values, wherein the result of the comparison is used to control the sharpening of the first colour component.

10. The method according to claim 9, wherein said comparing is used to determine the intensity of the sharpening, comprising:
maximizing the sharpening if the ratio of the comparing is smaller than the first limit value,
sharpening by an amount smaller than the maximum value if the ratio of the comparing is within the value range defined by the first and the second limit values, and
not sharpening the first colour component in other cases.

11. The method according to claim 1, wherein the sharpening of said second colour component is based on the extent of the change caused by the sharpening of the first colour component on the first colour component.

12. The method according to claim 11, wherein a reference value is determined, and that the sharpening value of the first colour component is added to said second colour component to sharpen said second colour component, if the extent of the change caused by the sharpening on the first colour component is smaller than or equal to a determined reference value.

13. The method according to claim 12, wherein a reference value is determined, and that the sharpening of said second colour component is proportioned to the neighbour pixels of the second colour component, if the extent of the change caused by the sharpening on the first colour component is greater than the determined reference value.

14. The method according to claim 1, wherein the method is used for sharpening at least two other colour components.

15. The method according to claim 1, wherein the first colour component is the one with the greatest number of pixels and/or the greatest effect on the luminance of the image.

16. The method according to claim 1, wherein the sharpening is amplified at the pixels representing an edge.

17. The method according to claim 1, wherein the sharpening is limited, if the change caused by the sharpening is greater than that determined.

18. The method according to claim 1, wherein the colour components belong to a colour system which has been selected from the group RGB, CMY, CMYK, HSI, or YUV.

19. A method comprising:
processing digital signals in an image comprising a plurality of colour components,
selecting only one of said colour components for a sharpening process,
computing the change of the selected colour component in at least two different directions to obtain at least two original change values,
selecting, from the computed original change values, at least a maximum value and a minimum value to obtain at least two change values,
determining a ratio between a first original change value and another original change value, wherein said first original change value is the smaller of the absolute values of the selected minimum and maximum values and said another original change value is any of the remaining original change values.

20. The method according to claim 19, wherein said another original change value is the larger of the absolute values of the selected minimum and maximum values.

21. The method according to claim 19, wherein said another original change value is the absolute value of an original change value that is, in order of the original change values, closer to the value having a larger absolute value of the selected minimum and maximum values than to the value having a smaller absolute value.

22. The method according to claim 19, wherein the determined ratio is used to control the degree of processing of the selected colour component.

23. The method according to claim 22, wherein the control comprises:
selecting at least one limit value,
comparing the determined ratio with at least one limit value, wherein the result of the comparison is used to control the processing of the first colour component.

24. The method according to claim 23, wherein the selected colour component is processed, if said ratio is smaller than said limit value.

25. The method according to claim 22, wherein the control comprises:
selecting at least a first limit value and a second limit value,
comparing the determined ratio with said first and second limit values, wherein the result of the comparison is used to control the processing of the selected colour component.

26. The method according to claim 25, wherein said comparing is used to determine the intensity of the sharpening, comprising:
maximizing the sharpening if the ratio of the comparing is smaller than the selected limit value,
sharpening by an amount smaller than the maximum value if the ratio of the comparing is within the value range defined by the first and the second limit values, and
not sharpening the selected colour component in other cases.

27. The method according to claim 19, wherein the colour components belong to a colour system which has been selected from the group RGB, CMY, CMYK, HSI, or YUV.

28. A digital filter, for processing digital signals in an image comprising at least one colour component, wherein the digital filter is arranged to implement the method of claim 19.

29. A system comprising:
an interpolator configured to interpolate a first colour component and a second colour component of an image having pixels comprising information about the first colour component placed at least partly in different locations than the pixels comprising information of the second colour component, and
a sharpening unit configured to sharpen at least said first colour component, said sharpening unit configured to compute the change of the first colour component in at least two different directions to obtain at least two original values, configured to select, from the computed original change values, at least a minimum value and a maximum value to obtain at least two change values based on said at least two original change values, and configured to determine a ratio based on said change values,
wherein the sharpening unit is also configured to control the sharpening of said second colour component based on the sharpening of said first colour component.

30. The system according to claim 29, wherein the sharpening unit configured to determine the ratio is arranged to compute the ratio between a first change value and another change value.

31. The system according to claim 29 wherein the system is arranged to use the computed ratio for controlling the degree of sharpening of the colour component.

32. The system according to claim 31, wherein the system is also configured
to select at least a first limit value and a second limit value,
to compare the determined ratio with said first and second limit values, wherein the result of the comparison is arranged to be used to control the sharpening of the first colour component.

33. A device for forming an image, comprising:
a sharpening unit configured to sharpen colours in an image with at least a first colour component and a second colour component, the image comprising pixels comprising information about the first colour component being placed at least partly in different locations than pixels comprising information of the second colour component, said sharpening unit configured to compute the change of the first colour component in at least two different directions to obtain at least two original values, to select, from the computed original change values, at least a minimum value and a maximum value to obtain at least two change values, based on said at least two original change values, and to determine the ratio based on said change values,
an interpolator configured to interpolate said first colour component and said second colour component, and
wherein the sharpening unit is also configured to control sharpening of said second colour component based on the sharpening of said first colour component.

34. The device according to claim 33, wherein the sharpening unit configured to determine the ratio is arranged to compute the ratio between a first change value and another change value.

35. The device according to claim 33, wherein the device is arranged to use the computed ratio for controlling the degree of sharpening of the colour component.

36. The device according to claim 35, wherein the device is also configured
to select at least a first limit value and a second limit value,
to compare the determined ration with said first and second limit values, wherein the result of the comparison is arranged to be used to control the sharpening of the first colour component.

37. The device according to claim 33, wherein the device comprises means for mobile communication.

38. A computer readable medium storing a computer program, wherein the computer program comprises computer commands for sharpening colours in an image with at least a first and a second colour component, and pixels comprising information about the first colour component being placed at least partly in different locations than pixels comprising information of the second colour component, which computer program comprises computer commands for interpolating said first colour component and said second colour component, and computer commands for performing sharpening of at least said first colour component, said computer commands including commands,
for computing the change of the first colour component in at least two different directions to obtain at least two original change values,
for selecting at least a minimum value and a maximum value to obtain at least two change values based on said at least two original change values, and, for determining a ratio based on said change values,
wherein the computer program-also comprises computer commands for controlling the sharpening of said second colour component based on the sharpening of said first colour component.

39. A computer readable medium storing a computer program comprising computer commands for execution by a processor, such that when executed said commands are for sharpening colours in an image with at least a first and a second colour component, and pixels comprising information about the first colour component being placed at least partly in different locations than pixels comprising information of the second colour component, which computer program comprises computer commands for interpolating said first colour component and said second colour component, and computer commands for performing sharpening of at least said first colour component, said computer commands including commands
for computing the change of the first colour component in at least two different directions to obtain at least two original change values,
for selecting at least a minimum value and a maximum value to obtain at least two change values based on said at least two original change values, and,
for determining a ratio based on said change values,
wherein the computer program also comprises computer commands for controlling the sharpening of said second colour component based on the sharpening of said first colour component.

40. A system comprising:
means for interpolating a first colour component and a second colour component of an image having pixels comprising information about the first colour component placed at least partly in different locations than the pixels comprising information of the second colour component, and
means for sharpening at least said first colour component, for computing the change of the first colour component in at least two different directions to obtain at least two original values, and for selecting from the computed original change values, at least a minimum value and a maximum value to obtain at least two change values based on said at least two original change values, and for determining a ratio based on said change values,
wherein the means for sharpening sharpens said second colour component based on the sharpening of said first colour component.

* * * * *